I. A. Stafford,
Furniture Caster.

№ 30,505. Patented Oct. 23, 1860.

Witnesses:
Edw. F. Brown
J. B. Woodruff

Inventor.
Ira A. Stafford

UNITED STATES PATENT OFFICE.

IRA A. STAFFORD, OF ESSEX, NEW YORK.

FURNITURE-CASTER.

Specification of Letters Patent No. 30,505, dated October 23, 1860.

*To all whom it may concern:*

Be it known that I, IRA A. STAFFORD, of the town of Essex, in the county of Essex and State of New York, have invented a new and useful Improvement in Casters for Furniture and other Purposes; and the following is a clear and exact description of the same, reference being had to the accompanying drawings, and the letters of reference marked thereon, making a part of this specification, in which—

Figure 1:
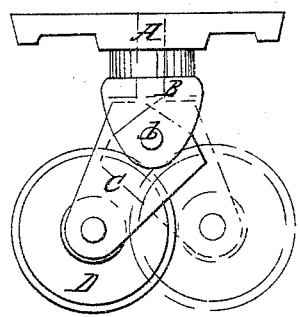
Figure 2:
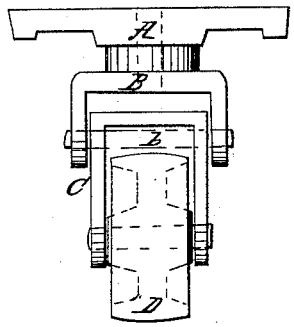
Figure 2:
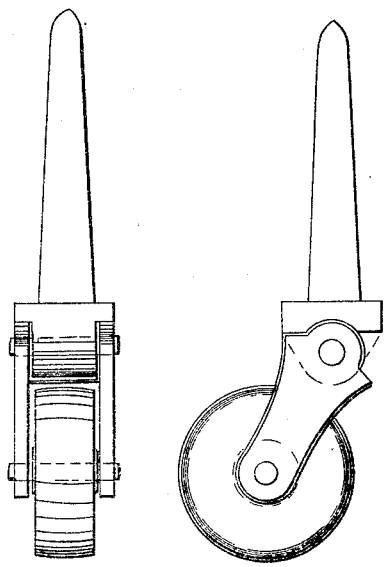

Figure 1, shows the side view of the caster the position of the roller changed in dotted and red lines. Fig. 2 represents the edge view.

My invention consists in making a joint in the caster stirrup so that it will reverse itself without having to turn on its swivel.

To enable others skilled in the art, to make and use my invention, I will describe it more fully.

The casters may be made with a stem, a socket, or plates, to secure them to any thing for which they are needed, in any of the usual modes. The plate (A,) as shown in (Figs. 1 and 2,) has a short stirrup, or piece (B,) pivoted in the center, to swivel around in the ordinary manner, to which is hinged the roller or caster stirrup (C,) by putting a pin (b,) through the ears of the short stirrup (B,) and the part (c,) above the roller (D,) so as to allow it to change its position right and left, to a suitable angle to move easily, and it will reverse its position so as to obviate the necessity of it turning half around when the motion to be reversed is in a line.

It is well known that all of the swivel casters cannot turn around, without describing a circle and carrying the object mounted on them as far out of a direct line as the center of the roller is from the swivel pin, which is very objectionable in many places where casters are used—for instance dining tables, jack-up bedsteads, and other articles of furniture—and particularly on reaping and mowing machines, where a caster roller is often used, my invention is indispensable to make it operate well.

Having thus described my invention, what I claim as new and desire to secure by Letters Patent is—

Making a joint in the caster stirrup so as to enable it to reverse its position and form an angle right, or left, in the manner herein described, and for the purposes specified.

IRA A. STAFFORD.

Witnesses:
 EDM. F. BROWN,
 J. B. WOODRUFF.